US011047135B2

(12) United States Patent
Marandos et al.

(10) Patent No.: US 11,047,135 B2
(45) Date of Patent: Jun. 29, 2021

(54) MOULDED CLADDING PANEL

(71) Applicant: AUS GROUP ALLIANCE PTY LTD, Melbourne (AU)

(72) Inventors: Nicholas Marandos, Melbourne (AU); Graeme Peter Hall, Melbourne (AU)

(73) Assignee: AUS GROUP ALLIANCE PTY LTD, Melbourne (AU)

( * ) Notice: Subject to any disclaimer, the term of this patent is extended or adjusted under 35 U.S.C. 154(b) by 0 days.

(21) Appl. No.: 16/491,937

(22) PCT Filed: Mar. 8, 2018

(86) PCT No.: PCT/AU2018/050211
§ 371 (c)(1),
(2) Date: Sep. 6, 2019

(87) PCT Pub. No.: WO2018/161122
PCT Pub. Date: Sep. 13, 2018

(65) Prior Publication Data
US 2021/0140177 A1 May 13, 2021

(30) Foreign Application Priority Data
Mar. 9, 2017 (AU) ................................ 2017900830

(51) Int. Cl.
*B29C 41/04* (2006.01)
*E04F 13/08* (2006.01)
(Continued)

(52) U.S. Cl.
CPC .............. *E04F 13/18* (2013.01); *B29C 41/04* (2013.01); *E04F 13/0803* (2013.01); *B29K 2023/06* (2013.01); *B29L 2031/10* (2013.01)

(58) Field of Classification Search
CPC ...... E04F 13/18; E04F 13/0803; B29C 41/04; B29K 2023/06; B29L 2031/10
(Continued)

(56) References Cited

U.S. PATENT DOCUMENTS

| 2,999,568 A | 9/1961 | Ludwig et al. |
| 3,037,593 A | 6/1962 | Webster |

(Continued)

FOREIGN PATENT DOCUMENTS

| CA | 2 248 428 | 9/1998 |
| EP | 41181 A2 * | 12/1981 |

(Continued)

OTHER PUBLICATIONS

QueenslandRail, Systems and Capability Technical Requirement, "Design of Noise Barriers Adjacent to Railways", Sep. 30, 2010.
(Continued)

*Primary Examiner* — Brent W Herring
(74) *Attorney, Agent, or Firm* — Knobbe Martens Olson & Bear, LLP (57) ABSTRACT

Some embodiments relate to a moulded cladding panel. The panel may comprise: a hollow plastic body formed by rotational moulding, the body having a length, a width and a depth, a first end, an opposite second end, an upper section, an opposite lower section, a first major face defined by a front wall extending from the first end to the second end and from the upper section to the lower section, and a second major face defined by a back wall opposite the first major face, the second major face extending from the first end to the second end and from the upper section to the lower section. The upper section defines a plurality of first mounting formations to facilitate mounting of the panel to a
(Continued)

structure to be clad. The lower section defines a plurality of second mounting formations to facilitate mounting the panel to the structure.

21 Claims, 8 Drawing Sheets (51) Int. Cl.
*B29L 31/10* (2006.01)
*E04F 13/18* (2006.01)

(58) Field of Classification Search
USPC ...... 52/235, 506.01, 506.06, 506.08, 506.09, 52/506.1, 508
See application file for complete search history.

(56) References Cited

U.S. PATENT DOCUMENTS

| | | | |
|---|---|---|---|
| 3,627,362 A | 12/1971 | Brenneman | |
| 3,662,410 A | 5/1972 | Lankheet | |
| 4,160,491 A | 7/1979 | Matsumoto et al. | |
| 4,292,015 A * | 9/1981 | Hritz | B29C 33/36 425/162 |
| 4,749,533 A * | 6/1988 | Payne | B29B 7/7476 264/311 |
| 4,852,310 A | 8/1989 | Henley et al. | |
| 4,984,406 A | 1/1991 | Friessen | |
| 5,040,352 A | 8/1991 | Oberlander et al. | |
| 5,150,993 A | 9/1992 | Miller | |
| 5,217,771 A | 6/1993 | Schmanski et al. | |
| 5,239,798 A * | 8/1993 | Saito | E04B 2/92 52/235 |
| 5,271,338 A | 12/1993 | Bonham | |
| 5,272,284 A | 12/1993 | Schmnski | |
| 5,372,866 A | 12/1994 | Oberlander et al. | |
| 5,379,561 A * | 1/1995 | Saito | E04B 2/92 52/235 |
| 5,459,971 A | 10/1995 | Sparkman | |
| 5,485,703 A | 1/1996 | Nordahl | |
| 5,560,630 A | 10/1996 | Phares et al. | |
| 5,564,586 A | 10/1996 | Goodwin | |
| 5,702,090 A | 12/1997 | Edgman | |
| 5,941,041 A | 8/1999 | Robinson et al. | |
| 6,178,713 B1 * | 1/2001 | Delie | E04F 13/0826 52/506.08 |
| 6,180,203 B1 | 1/2001 | Unkles | |
| 6,412,597 B1 | 7/2002 | Schola et al. | |
| 6,609,339 B1 * | 8/2003 | Pardue | E04F 13/0801 52/235 |
| 6,637,728 B2 | 10/2003 | Pettit et al. | |
| 6,679,021 B2 | 1/2004 | Maimon et al. | |
| 6,719,277 B2 | 4/2004 | Ohanesian | |
| 6,745,537 B1 | 6/2004 | Hamilton | |
| 6,899,200 B1 | 5/2005 | Roberts et al. | |
| 7,220,077 B2 | 5/2007 | Humphries et al. | |
| 7,240,637 B2 | 7/2007 | Rosen | |
| 7,478,797 B2 | 1/2009 | Laws et al. | |
| 7,549,263 B1 | 6/2009 | Porter | |
| 7,635,114 B2 | 12/2009 | Laws et al. | |
| 7,665,574 B2 | 2/2010 | Schoela et al. | |
| 7,677,007 B2 | 3/2010 | Parker | |
| 7,726,633 B2 | 6/2010 | Cook et al. | |
| 7,739,846 B2 | 6/2010 | Garrett | |
| 8,161,711 B2 | 4/2012 | Steed et al. | |
| 8,176,697 B1 | 5/2012 | Bolander, II | |
| 8,196,365 B2 | 6/2012 | Parshad | |
| 8,511,648 B2 | 8/2013 | McCarthy et al. | |
| 8,561,360 B2 | 10/2013 | Corbin, Jr. | |
| 8,579,080 B2 | 11/2013 | Angelico | |
| 8,651,232 B2 | 2/2014 | Kedar et al. | |
| 9,091,069 B2 | 7/2015 | Marandos et al. | |
| 9,499,978 B2 | 11/2016 | Glancy | |
| 9,714,110 B2 | 7/2017 | Veltrop et al. | |
| 9,803,372 B2 * | 10/2017 | Griffiths | E04F 13/083 |
| 10,472,825 B2 | 11/2019 | Marandos et al. | |
| 2001/0009703 A1 | 7/2001 | Toshikawa | |
| 2002/0000545 A1 | 1/2002 | Pettit et al. | |
| 2002/0094399 A1 * | 7/2002 | Rhodes, Jr. | B29C 65/3644 428/36.9 |
| 2003/0019170 A1 | 1/2003 | Donnelly | |
| 2004/0045488 A1 | 3/2004 | Danzik et al. | |
| 2004/0121100 A1 | 6/2004 | Potempa | |
| 2005/0126852 A1 | 6/2005 | Nakajima et al. | |
| 2007/0131480 A1 | 6/2007 | Corbin et al. | |
| 2007/0158629 A1 | 7/2007 | Laws et al. | |
| 2008/0010927 A1 * | 1/2008 | Wilson | E04F 13/18 52/387 |
| 2009/0056257 A1 | 3/2009 | Mollinger et al. | |
| 2009/0193735 A1 | 8/2009 | Kalinowski | |
| 2010/0154331 A1 | 6/2010 | Dickens | |
| 2011/0167749 A1 | 7/2011 | Azizi | |
| 2016/0102462 A1 * | 4/2016 | Griffiths | E04F 13/0889 52/550 |
| 2020/0071931 A1 | 3/2020 | Marandos et al. | |
| 2020/0385982 A1 * | 12/2020 | Rivas | E04B 1/14 |
| 2021/0102349 A1 | 4/2021 | Marandos et al. | |

FOREIGN PATENT DOCUMENTS

| | | |
|---|---|---|
| EP | 2 466 010 | 6/2012 |
| FR | 2 267 603 | 11/1975 |
| FR | 2 899 257 | 5/2007 |
| GB | 1 087 713 | 10/1967 |
| KR | 10-1331408 | 11/2013 |
| KR | 10-1399289 | 5/2014 |
| WO | WO 1997/038839 | 10/1997 |
| WO | WO 1999/019574 | 4/1999 |
| WO | WO 2000/042255 | 7/2000 |
| WO | WO 2005/014947 | 2/2005 |
| WO | WO 2015/089586 | 6/2015 |
| WO | WO 2018/195605 | 11/2018 |

OTHER PUBLICATIONS

International Search Report issued in PCT Application No. PCT/AU2018/050211, dated Jun. 12, 2018, in 5 pages.

* cited by examiner

SECTION B-B FIG. 4

SECTION C-C FIG. 5

SECTION A-A
FIG. 3

MOULDED CLADDING PANEL

CROSS-REFERENCE TO RELATED APPLICATIONS

This application is a United States national stage application under 35 U.S.C. § 371 of PCT Application No. PCT/AU2018/050211 designating the United States, filed on Mar. 8, 2018, which claims priority to Australian Patent App. No. 2017900830, filed on Mar. 9, 2017.

TECHNICAL FIELD

The described embodiments relate generally to cladding panels, such as moulded plastic cladding panels and other structures using such panels and methods of their formation. Particular embodiments relate to rotationally moulded plastic panels suitable for use in decorative and/or function cladding for various structures. The plastic panels may be generally hollow.

BACKGROUND

Certain building structures require cladding, either for improved aesthetic appearance or for functional (e.g. protective) reasons, or both. Fabrication and erection of such cladding can be expensive and/or time-consuming.

In some instances, cladding must be positioned over a significant area of a structure, so cladding materials that are high cost or are difficult to erect can be even more costly or troublesome because of the large area required to be clad. Commonly, the materials used in existing cladding include wood, concrete and/or steel. Steel panels are heavy and expensive and subject to graffiti. Wood panels are subject to burning, are more prone to deterioration and need significant maintenance. Concrete panels are quite heavy and can be prone to cracking or chipping. As it is commonly preferred to have cladding that provides an aesthetically appealing appearance, cracking or chipping of the panels is undesirable and the panel manufacturer may be required to replace any such damaged panel at its own cost. Further, concrete panel forming processes provide only limited flexibility to confer an appealing aesthetic appearance on an external face of the panel.

Another problem encountered in relation to some erected cladding material is the potential for vandalism, such as spray painted graffiti. Removal of graffiti from concrete panels can be problematic and expensive. Similarly, where a clad structure is adjacent an area that throws up air-born particulate, such as a roadway, airborne pollutants commonly accrete onto the panels over time and need to be cleaned in order maintain an aesthetically pleasing appearance. For some panel materials, it can be hard to clean the pollutants from the panel surfaces.

It is desired to address or ameliorate one or more shortcomings or disadvantages associated with prior techniques for sound attenuation barriers and panels, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a moulded cladding panel, comprising:
a hollow plastic body formed by rotational moulding, the body having a length, a width and a depth, a first end, an opposite second end, an upper section, an opposite lower section, a first major face defined by a front wall extending from the first end to the second end and from the upper section to the lower section, and a second major face defined by a back wall opposite the first major face, the second major face extending from the first end to the second end and from the upper section to the lower section;
wherein the upper section defines a plurality of first mounting formations to facilitate mounting of the panel to a structure to be clad; and
wherein the lower section defines a plurality of second mounting formations to facilitate mounting the panel to the structure.

The second major face may define a plurality of asymmetric surface variations. The body may be free of internal and/or external non-moulded reinforcing structure. The body may comprise at least one bridging portion where a part of the back wall extends inwardly to contact the front wall or an internal projection of the front wall, the at least one bridging portion being disposed between the first and second ends and between the upper and lower sections. The at least one bridging portion comprises a plurality of bridging portions disposed at spaced locations along the length and width of the body. Such bridging portions may alternatively be called kiss-offs.

A vertical cross-sectional profile of the body may be varied across the length of the body.

The first mounting formations may be disposed at an upper part of the second major face, wherein the first major face is an externally facing face of the panel and the second major face faces the structure when the panel is mounted to the structure. The first mounting formations may be disposed on an inwardly recessed area of the second major face. The first mounting formations may be disposed in a wall portion of the inwardly recessed area that is arranged to be generally horizontal when the panel is mounted to the structure in a vertical orientation. The first mounting formations may comprise a plurality of first apertures in the second major face.

The mounting formations may comprise a central mounting formation and at least first and second side mounting formations that are disposed on respective first and second lateral sides of the central mounting formation. The first and second side mounting formations may be arranged to permit movement of the body relative to the structure and the central mounting formation may be arranged to keep a central part of the body substantially laterally fixed relative to the structure. The central mounting formation may comprises a non-slotted aperture and the first and second side mounting formations may each comprise a slotted aperture.

The first apertures may define respective openings into the hollow interior of the body. The second mounting formations may have different formations from the first mounting formations. The second mounting formations may comprise a plurality of second apertures in the second major face. The second apertures may not define openings into the hollow interior of the body. The second apertures may be defined through opposed external surfaces of the second mounting formations.

The first mounting formations may comprise first recessed sections of the second major face. The second mounting formations may comprise second recessed sections of the second major face.

The length of the panel may be between about 2 m and about 4 m. The depth of the panel may be between about 150 mm and about 500 mm. The width of the panel may be between about 1 m and about 3 m. The weight of the panel may be between about 60 kg and about 150 kg.

The panel may have a substantially closed hollow shell structure defined at least in part by the front and back walls. The shell structure may be formed of at least one polyolefin material suitable for rotational moulding. The body may be formed of a substantially same material. The body may be an integrally formed unitary body.

Some embodiments relate to a cladded structure, comprising:
  a structure; and
  at least one panel as described above mounted to the structure.

The panels may be positioned end-to end in a line along the support structure.

Some embodiments relate to a method of erecting cladding, comprising:
  positioning at least one panel as described above to be supported in relation to a structure to be clad; and
  fixedly coupling the at least one panel to the structure.

The positioning may comprise positioning two of the panels end-to-end in a line along a face of the structure.

Some embodiments relate to a method of manufacturing a plastic cladding panel, the method comprising:
  rotationally moulding a hollow plastic body formed by rotational moulding, the body having a length, a width and a depth, a first end, an opposite second end, an upper section, an opposite lower section, a first major face defined by a front wall extending from the first end to the second end and from the upper section to the lower section, and a second major face defined by a back wall opposite the first major face, the second major face extending from the first end to the second end and from the upper section to the lower section;
  forming the upper section to define a plurality of first mounting formations to facilitate mounting of the panel to a structure to be clad; and
  forming the lower section to define a plurality of second mounting formations to facilitate mounting the panel to the structure.

The length of the panel may be formed to be between about 2 m and about 4 m.

Some embodiments relate to a cladding for a building, comprising support structure and a plurality of the cladding panels described herein, wherein the panels are coupled to the support structure to form at least part of the cladding.

Some embodiments relate to a building exterior, comprising support structure and a plurality of the panels described herein, wherein the panels are coupled to the support structure to form at least part of the building exterior. Some embodiments relate to a building structure comprising a plurality of the panels described herein.

BRIEF DESCRIPTION OF DRAWINGS

Embodiments are described in further detail below, by way of example, with reference to the accompanying drawings, in which.

DETAILED DESCRIPTION

Described panels may be formed by rotational moulding techniques using existing rotational moulding technology. Such techniques may involve formation of a mould, addition of plastic granules into the mould, closure of the mould and then simultaneous rotation and heating of the plastic inside the closed mould in order to melt the plastic evenly around the heated surfaces of the mould. Use of rotational moulding techniques in the context of forming embodiments of plastic panels is described in more detail in relation to FIG. 22 of International Patent Application No. PCT/AU2014/050432, the entire contents of which is hereby incorporated by reference.

Described panels can be used as cladding on a structure or to form part of a building structure, for example. In some embodiments, described panels can be used together with support structures to form cladding that can extend across a large area, such as a building or structural facade. When used for such sound cladding purposes, described panels provide for a lighter, less expensive and more easily transportable form of panel than the concrete panels of the prior art.

Referring now to FIGS. 1A, 1B, 1C, 1D, 2A to 2F, and 3 to 6, a panel 100 according to some embodiments will now be described in further detail. Panel 100 comprises a front side wall 104, a back side wall 102, a first end face 103 at a first end 111, a second end face 105 (approximately parallel to the first end face 103) at a second end 112, a bottom edge face 106 and a substantially parallel top edge face 108. The first and second end faces 103, 105 may be contoured to respectively define a recessed area 107 and a projecting portion 109 that is complementary to the recessed portion 107. Using corresponding recessed portion 107 and projecting portion 109, multiple panels 100 can be placed end-to-end in alignment and held and/or supported by support structure, such as support beams 605, 610, 615 (FIG. 6), with the projection portion 109 of a second end 112 of one panel 100 nesting and mating with the recessed portion 107 of the first end 111 of an adjacent (identically or similarly formed) panel 100. In this way, the panels 100 can be arranged in a line one after of another, with the ends forming lap joints with one another. The end surfaces of adjacent ends 111, 112 of adjacent panels 100 may initially be positioned not to abut each other, so that there is some spacing to allow for thermal expansion or contraction in a lateral (horizontal) direction.

Panel 100 has an upper section 108a that includes the top edge face and an area of the front and back walls 104, 102 that is toward a top region of the panel 100. Panel 100 has a lower section 106a that includes the bottom edge face 106 and an area of the front and back walls 104, 102 that is toward a bottom region of the panel 100.

The thickness of the walls of panel 100 may be relatively uniform and may be nominally about 8 millimetres, although some small variation may occur across the different parts of the panel walls. Other panel embodiments may use a different nominal wall thickness, such as 6 to 10 millimetres, for example. Example dimensions given in the Figures are expressed generally in millimetres for distances or degrees for angles. These dimensions may vary in different embodiments and are intended to be illustrative, not restrictive.

The front face of the front side wall 104 may be formed to have a textured external surface, as shown and described in relation to co-pending and co-owned International Patent Application No. PCT/AU2013/001177, the entire contents of which is hereby incorporated by reference. The textured external surface may have a stone (matte) appearance and may comprise a visually discernible pattern, such as geometric shapes or one or more symbols or parts of symbols. The one or more symbols may define one or more words or may convey a specific meaning, for example. However, the back face of the back side wall 102 may be formed without a decorative textured external surface. The back surface of panel 100 will generally be hidden as it will be positioned against the outside of the structure to be clad. The back face of the panel 100 therefore can be used to define projections, recesses or other surface variations that permit the panel to be readily mounted on to mounting structure on the structure to be clad or directly onto the structure.

Formation of panel 100 by rotational moulding allows the creation of varied visually aesthetically appealing or meaningful indicia or patterns to be provided on the external exposed front face of front wall 104 of the panel 100, which may provide added appeal in some circumstances. In particular, use of a suitable mould allows the panel to be created with significant variation across the panel surfaces, which can give a decorative appearance. Additionally, such surface variations can assist in strengthening the panel walls and/or hiding or at least visually obscuring some expansion or contraction in the plastic wall panels due to environmental temperature variation.

Figure 2A:
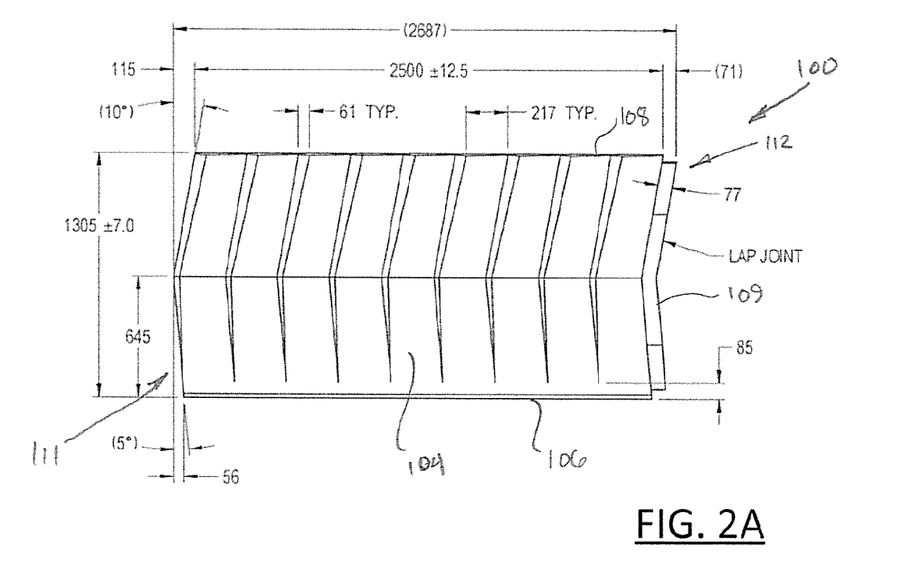
FIG. 2A is a front view of a front of the panel of FIG. 1A.
Figure 2B:
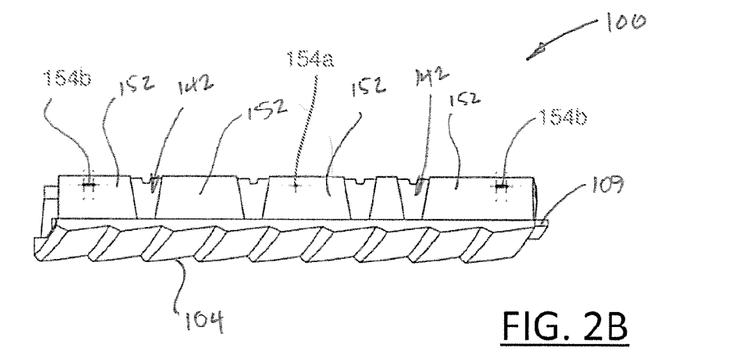
FIG. 2B is a bottom view of the panel of FIG. 2A.
Figure 2C:
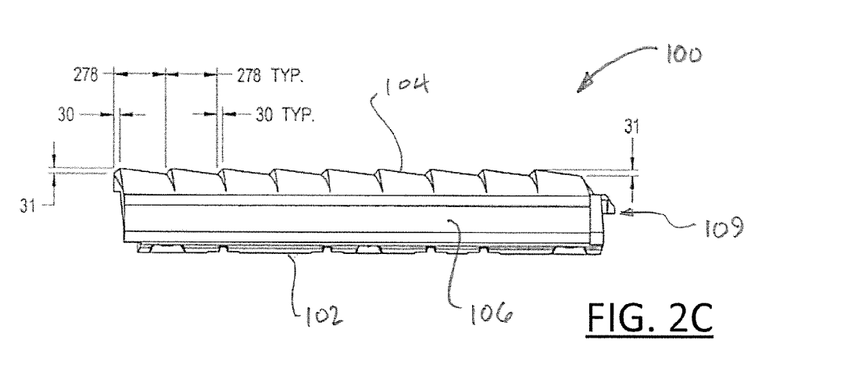
FIG. 2C is a top view of the panel of FIG. 2A.
Figure 2D:
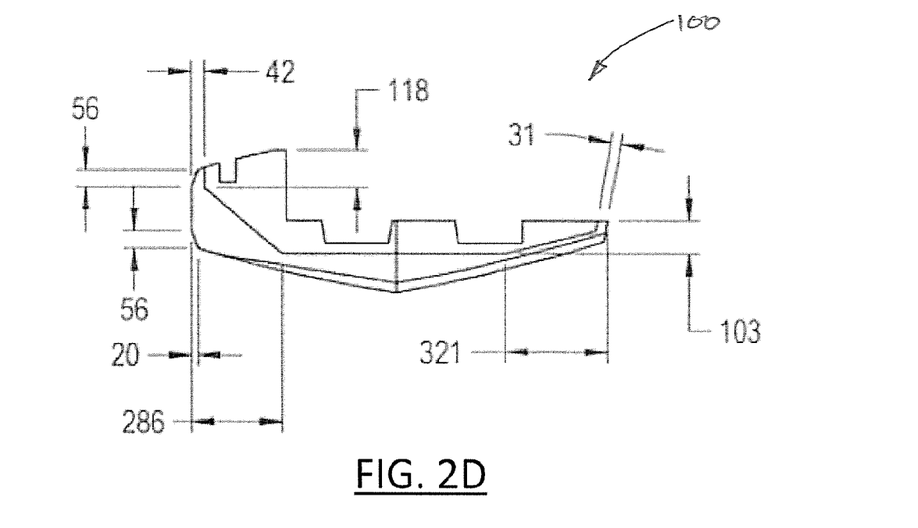
FIG. 2D is an end view of the panel of FIG. 2A.
Figure 2E:
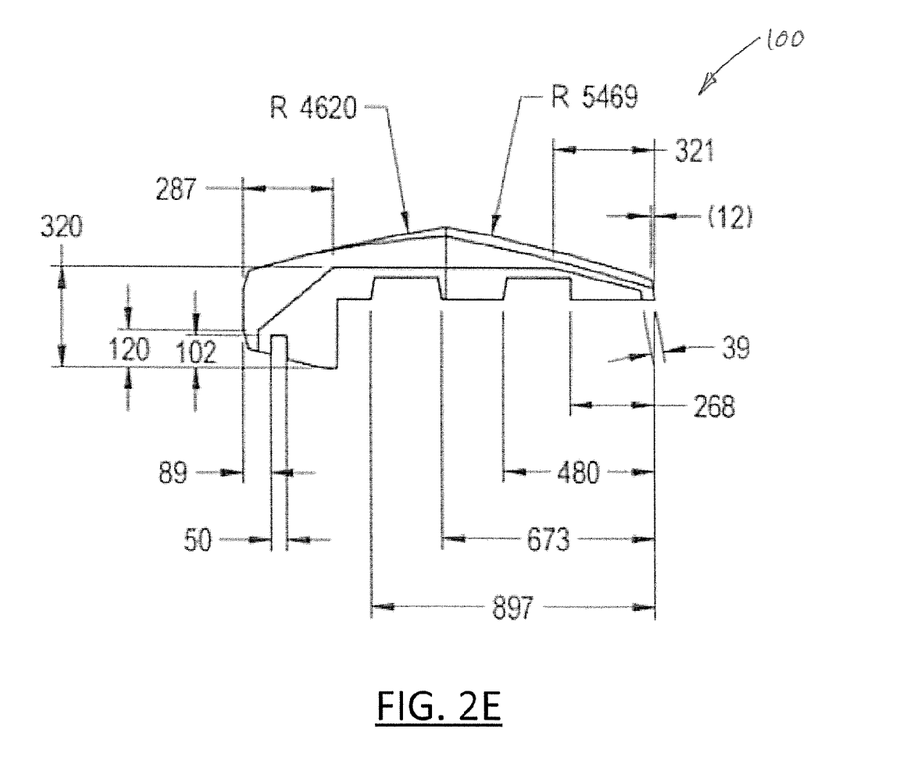
FIG. 2E is an opposite end view of the panel of FIG. 2E.

Each panel 100 has a length greater than its width and a width greater than its depth when the panel 100 is oriented vertically in a normal vertical cladding panel orientation as shown in FIGS. 1A, 2F, 3, 6 and 7 to 10. In the vertical orientation, the width dimension is the distance from the bottom edge 106 to the top edge 108, which is the same as the vertical height of the panel 100. The length of each panel 100 may be about three metres or somewhat under three metres (e.g. 2.5 to 2.95 m), while the width may be about one to two metres. In some embodiments, the width of the panel 100 may be up to about two metres or possibly up to about three metres. The width of the panel as shown in FIG. 2A is about 1305 mm, but this is an example only. The width may be different in other embodiments. The length of the panel as shown in FIG. 2A is about 2687 mm, but this is an example only. The length may be different in other embodiments.

Figures 3, 6:
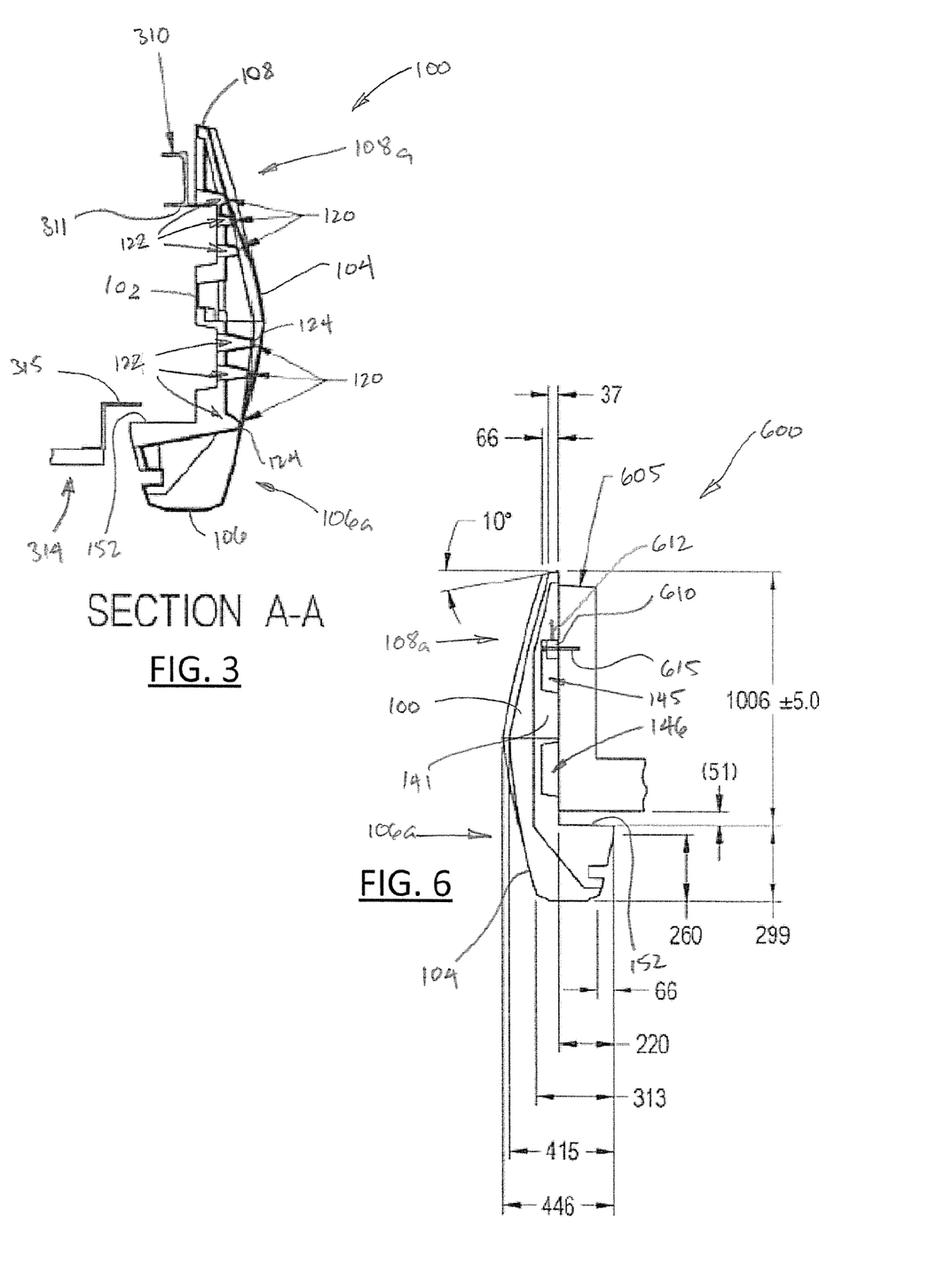
FIG. 3 is an end cross-sectional view of the panel of FIG. 2A, taken along line A-A of FIG. 2F and showing some internal detail of the panel.
FIG. 6 is an end view of the panel of FIG. 1A, showing how the panel can be mounted to a mounting structure.
Figure 4:
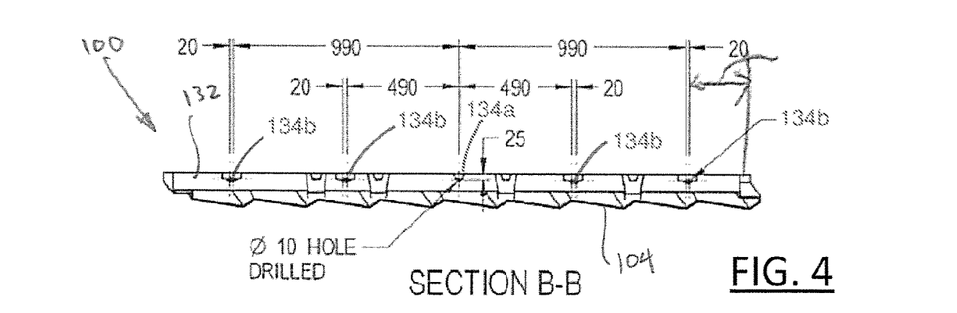
FIG. 4 is a cross-sectional view of a top part of the panel of FIG. 2A, taken along line B-B of FIG. 2F.
Figure 5:
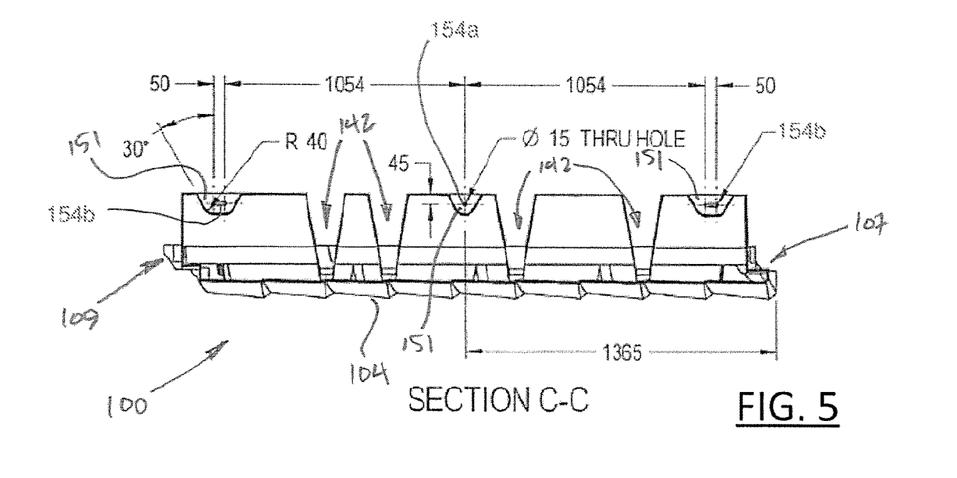
FIG. 5 is a cross-sectional view of a bottom part of the panel of FIG. 2A, taken along line C-C of FIG. 2F.

The maximum depth (between the outermost part of the front wall 104 and the outermost part of the back wall 102) of the panel 100 may be around 150 to around 500 millimetres or possibly around 300 to around 470 millimetres, for example. In the example embodiments of panel 100 shown in the Figures, the lower part 106a has a greater depth than the upper part 108a and is formed to have a curved or bent appearance so that the lower part 106a hangs under a part of the structure on which the panel 100 is to be mounted, as shown in FIGS. 3 and 6. Specific embodiments may have a top depth (measured at or adjacent the top edge face 106) of about 30 to around 80 mm and a bottom depth (measured at the bottom edge face 108) that is several times greater than the top depth, for example, 3 to 10 times greater. FIG. 6 shows a top depth of about 66 mm but this depth may in other embodiments be greater or lesser. The bottom depth at or adjacent edge face 108 may be around 150 mm to about 400 mm, for example. FIG. 6 shows a bottom depth of about 247 mm but this depth may in other embodiments be greater or lesser.

The example dimensions given here may be varied, depending upon requirements, and are intended to only be generally indicative of the dimensions of some embodiments. Other embodiments can have different dimensions. For example, the panel length may be shorter, in the order of 2, 2.2 or 2.4 metres or other lengths in between about 2 and 3 metres. The panel length may alternatively be longer than 2.5 metres, for example up to 3, 3.5, 4, 4.5 or 5 metres or up to about 6 metres. Panels of lengths above 4 metres may need to be constructed of multiple panel portions that are separately formed by rotational moulding and then coupled together, since many rotational moulding facilities cannot accommodate the formation of moulded structures having dimensions greater than 4 metres.

In the context of this application, given that the plastic panels described herein are subject to thermal expansion and contraction and may also experience some degree of flexion, the term "about" applied to a dimension of a part or a structural component of a panel should be understood to include dimensions in a range, such as an absolute range or a percentage range like 1%, 2%, 3%, 4% or 5%, either side the specified dimension. For example, a length of "about three metres" may be understood to include lengths in the range of 30-150 mm or possibly 50 to 100 mm more or less than three metres, which equates to a particular percentage range of variation.

In some embodiments, the panel 100 may be formed during the moulding process to define shallow grooves or notches adjacent to or along each of the end faces 103, 105 or along other panel surfaces. These grooves or notches are for receiving a sealing gasket (not shown), which may be a compressible elastomeric plastic, rubber or silicone strip, for example. The sealing gasket may be attached to the end faces 103, 105 or other panel surfaces in the notches by suitable attachment means, such as screws or adhesives, for example. In some embodiments, such sealing gaskets may be affixed to mounting parts, end parts or faces of the panel 100 without any grooves or notches being formed on or in the panel 100. The sealing gasket is to minimize any noise generation, such as rattling or vibration that otherwise might occur through a small gap between an edge or surface of the panel 100 and the support structure to which the panel 100 is coupled or between adjacent panels positioned end-to-end.

Panel embodiments described herein do not employ external reinforcing structure, such as metal beams, but instead rely on forming stiffening elements using the plastic panel material as part of the moulding process. Embodiments are therefore also free of non-moulded internal reinforcing structure. Such stiffening elements act as a form of reinforcing structure across the length and/or width of the panel. Such moulded reinforcing structure may comprise a number of strengthening or reinforcing elements, including for example: rigidifying variations in surface patterns; and moulded bridging or connection portions between the front and back walls.

The panel 100 has a longitudinal centre-line that may be considered to coincide or lie parallel with a longitudinal axis along the length of the panel 100. In some embodiments, panel 100 may be formed to have a width/height (i.e. distance between top and bottom edge faces 106, 108) different from that shown in FIG. 2A. References herein to "lateral" are intended to refer to spacing or distance along the length direction, as seen from the perspective of a person viewing the panel 100 in the upright orientation shown in FIG. 2A or 2F that the panel 100 is intended to be oriented in when mounted as a cladding panel. For example, first end 111 is disposed laterally opposite second end 112 in that view. Similarly, when considering a central part of the panel 100, the first and second ends 111, 112 are disposed to each lateral side of the central part.

Additionally, the end face 105 of the panel 100 has mating structure to allow the second ends 112 of adjacent panels 100 to nest and mate with each other while remaining physically unattached or not directly attached to each other. Such mating structure may include correspondingly shaped recesses and protrusions, such as a concave recessed portion 105b and convex protruding portion 105a. Such recessed portions 105b and protruding portions 105a may be relatively shallow in profile, each extending along at least part of the end face 105, and may be protruding or recessed by a maximum of about 5 to 15 mm, for example. When panels 100 are positioned end-to-end with their second ends 112 positioned closely adjacent to each other, and with the front and back walls 104, 102 facing the same direction, the recessed portion 105b is shaped to receive a corresponding protruding portion 105a of the neighbouring panel 100. This mating structure assists in minimising the possibility of gaps being visible in the second ends 112 of adjacent panels 100. For improved sound attenuation purposes, thin sealing gaskets or strips may line parts of the end faces 105 of adjacent panels 100.

In some embodiments, the panels 100 may be mounted onto supporting structure, such as an elongate, generally strong and rigid beam or bar 610 (FIG. 6), which may be formed of steel or another suitable metal, such as Aluminium, for example. The structure and arrangement of an example support structure 605 is shown in further detail in FIG. 6. The elongate bar 610 may be a steel square hollow section (SHS) or a rectangular hollow section (RHS), for example, or may in other embodiments be formed as an I-beam or other suitable beam shape. The support structure 605 shown in FIG. 6 may form part of a cladded structure 600 once the cladding panel 100 is mounted and fixed to the support structure 605. In the example illustrated in FIG. 6, the support structure 605 (which may form part of structure 600) may be (or be part of) a pre-cast concrete structure. The panel 100 may be mounted directly or indirectly to the support structure 605.

Referring also to FIGS. 1C, 1D, 2F, 4 and 5, mounting formations 130 and 150 are described in further detail, with reference to features on the back side 102 of the panel. The front side 104 may be considered to define a first major face of the panel 100 while the back side 102 may be considered to define an opposite second major face of the panel 100. Since the panel 100 is intended to be used as a cladding panel, the exterior face 104 is preferably primarily designed for aesthetics and is free of any appearance of mounting features, while the interior face 102 need not have any aesthetic function and is instead primarily designed for providing strength (through providing surface variation 141, 142, 143 and bridging portions 120) and allowing the panel 100 to be easily mounted onto the support structure 600.

Panel 100 has a set of upper mounting formations 130 defined in the upper section 108a and a set of lower mounting formations 150 defined in the lower section 106a. The upper mounting formations 130 are disposed at laterally spaced locations and are formed to have a recessed area 133 formed to be recessed upwardly (toward the upper edge 108) from an inward ledge 132 of the upper section 108a. The upper section 108a also has a vertical wall 131 extending downwardly from the top edge 108 toward the lower section 106a, with the vertical wall 131 being curbed by the inward ledge 132. The recessed areas 133 may be positioned at the transition of the vertical wall 131 and the inward ledge, so that the recessed area 133 is recessed from the vertical wall 133 as well as the inward ledge 132. Each recessed area has an aperture 134 defined in a wall surface thereof. Each aperture 134 defines a passage communicating from external of the panel 100 to an internal volume of the hollow shell of the panel 100.

Each aperture 134 is sized to receive a mounting pin 612 (FIG. 6) that projects upwardly from a mounting support bar 610. In this way, the panel 100 can be hung from the bar 610 by lowering the panel 100 onto the bar 610 so that the apertures 134 receive the mounting pins 612 and thereby project internally into the internal volume of the hollow shell of the panel 100. The mounting pins 612 are not locked into position in the apertures 134. The panel 100 is held in position on the pins 612 by gravity. The pins 612 may have a length of around 50-80 mm and a diameter of 8-10 mm, for example. The recessed area 133 of each mounting formation 130 allows space for the presence of a nut or other material at the base of the mounting pin 612 while allowing the remaining area of inward ledge 132 to rest on the upper surface of the bar 610 as shown in FIG. 6.

The upper mounting apertures 134 include a central aperture 134a that is not slotted, plus at least one other aperture 134b on each lateral side of the central aperture 134a that is slotted. In the example shown in the drawings, there are two slotted apertures 134b on each lateral side of the central aperture 134. The slotted apertures 134b allow for lateral expansion and contraction of parts of the plastic material of the panel 100 due to environmental temperature variations, while the locating pin 612 in the central aperture 134a keeps the panel 100 centrally positioned and substantially fixed despite any lateral expansion or contraction of the panel on either side of the central aperture 134. The slotted apertures 134b also allow for variance in the lateral location of mounting pins 612 to be accommodated.

The arrangement of the mounting formations 150 is similar but somewhat different from mounting formations 130. Mounting formations 150 are intended to allow the panel 100 to be fixed relative to the support structure 605 in the region of the lower section 106a, in order to complement the positioning achieved by the upper mounting formations 130 relative to the mounting bar 610. The mounting formations 150 comprise a series of lower mounting apertures 154 disposed in plate-like sections of a lower (horizontal) ledge 152 that is formed in the lower section 106a and that faces the inward ledge 132 of the upper section 108a. The plate-like sections of the lower ledge 152 are formed by the rotational moulding process to be not solid (not hollow) wall sections whereby apertures 154 formed in the plate-like sections pass through opposed upper (152) and lower (151) surfaces of those sections. The lower mounting apertures 154 thus allow receipt of a coupling mechanism, such as a bolt 756 (FIG. 7), to be directed upwardly through the respective aperture 154 and into a receiving portion on a lower section of the support structure 605, thereby fixing the panel 100 against any swinging or upward movement (e.g. due to wind forces) that might otherwise occur.

Each lower mounting formation 150 has a recessed area defined by a recessed wall section 153 on its underside. The recessed area allows installation personnel to access the aperture 154 from the underside of ledge 152 to project the coupling mechanism through the lower surface 151 and then through the upper surface (i.e. ledge 152) of the plate-like section and then to couple with a cooperating part of the support structure 605. The ledge 152 of the lower section 106a is formed to be positioned with a gap between it and the lower face of the support structure 605 to which the lower section 106a is to be coupled, in order to allow for some vertical expansion or contraction of the panel 100 due to environmental temperature variations. The gap may be selected to be nominally in the range of around 10 to around 50 mm, for example.

The lower mounting apertures 154 include a central aperture 154a that is not slotted, plus at least one other aperture 154b on each lateral side of the central aperture 154a that is slotted. In the example shown in the drawings, there is one slotted aperture 154b on each lateral side of the central aperture 154a. The slotted apertures 154b (like the slotted ones of apertures 134b) allow for lateral expansion and contraction of parts of the plastic material of the panel 100 due to environmental temperature variations, while the coupling mechanism (e.g. bolt 756) in the central aperture 154a keeps the panel 100 centrally positioned and substantially fixed despite any lateral expansion or contraction of the panel on either side of the central aperture 154a. The slotted apertures 154b also allow for variance in the lateral location of mounting pins 612 to be accommodated. The central upper mounting formation 130 and the central lower mounting formation 150 may be generally (vertically) aligned in a laterally central part of the panel 100. Both upper mounting apertures 134 and lower mounting apertures 154 may be formed by cutting, drilling or otherwise removing plastic wall material at the appropriate locations after the panel has been moulded and cooled.

In the illustrated embodiments, the number of lower mounting formations 150 (and lower mounting apertures 154) is different from the number of upper mounting formations 130 (and upper mounting apertures 134). For example, 5 upper mounting formations are provided and 3 lower mounting formations are provided. In other embodiments, the same number of upper and lower mounting formations 130, 150 (and upper and lower mounting apertures 134, 154) may be formed in the panel 100 or other different numbers of mounting formations 130, 150 (and upper and lower mounting apertures 134, 154) may be formed.

Figure 1A:
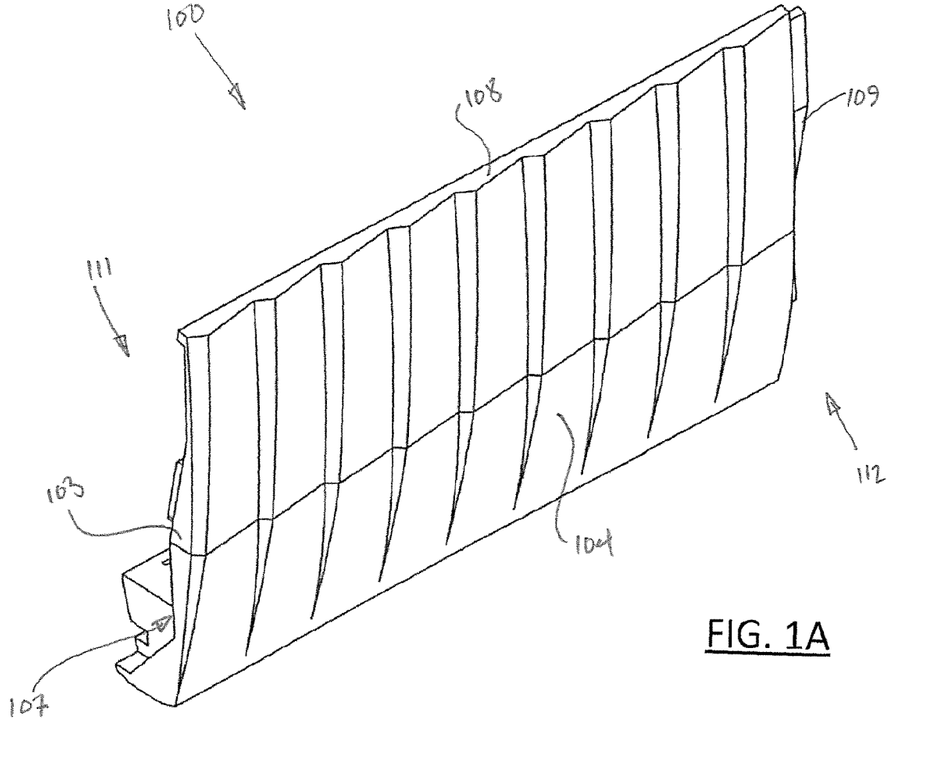
FIG. 1A is a perspective view of a front side of a panel according to some embodiments.
Figure 1B:
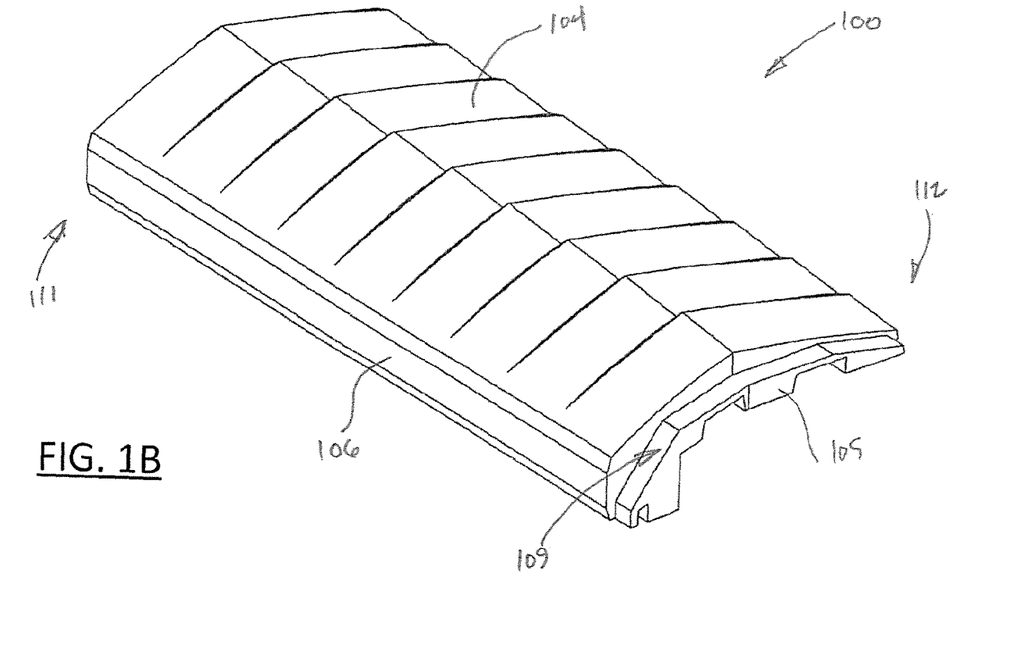
FIG. 1B is a further perspective view of the front side of the panel of FIG. 1A.
Figure 1C:
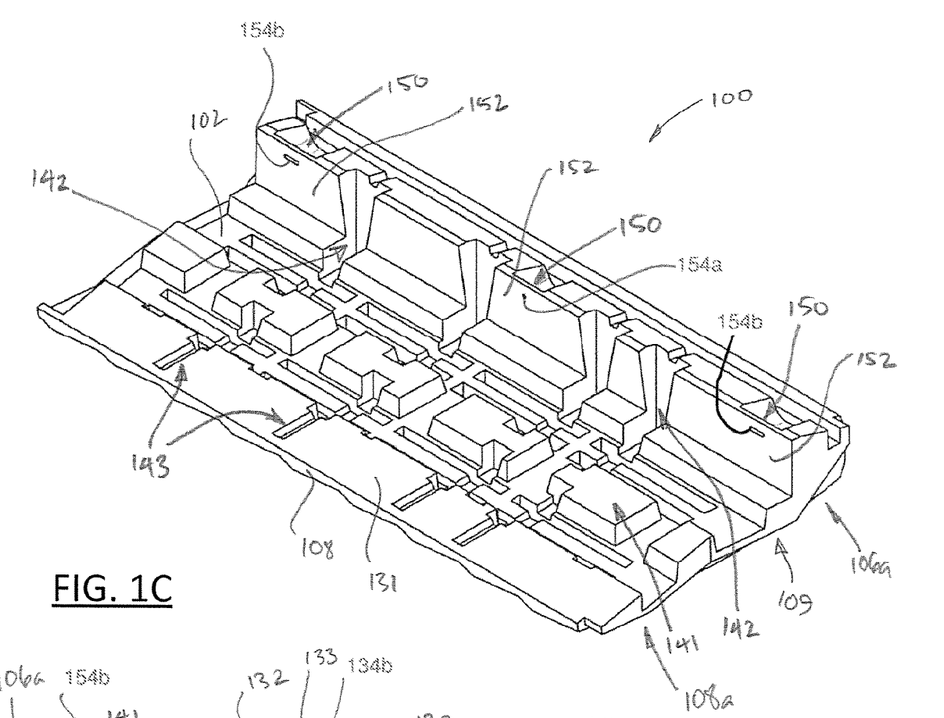
FIG. 1C is a perspective view of a back side of the panel of FIG. 1A.
Figure 1D:
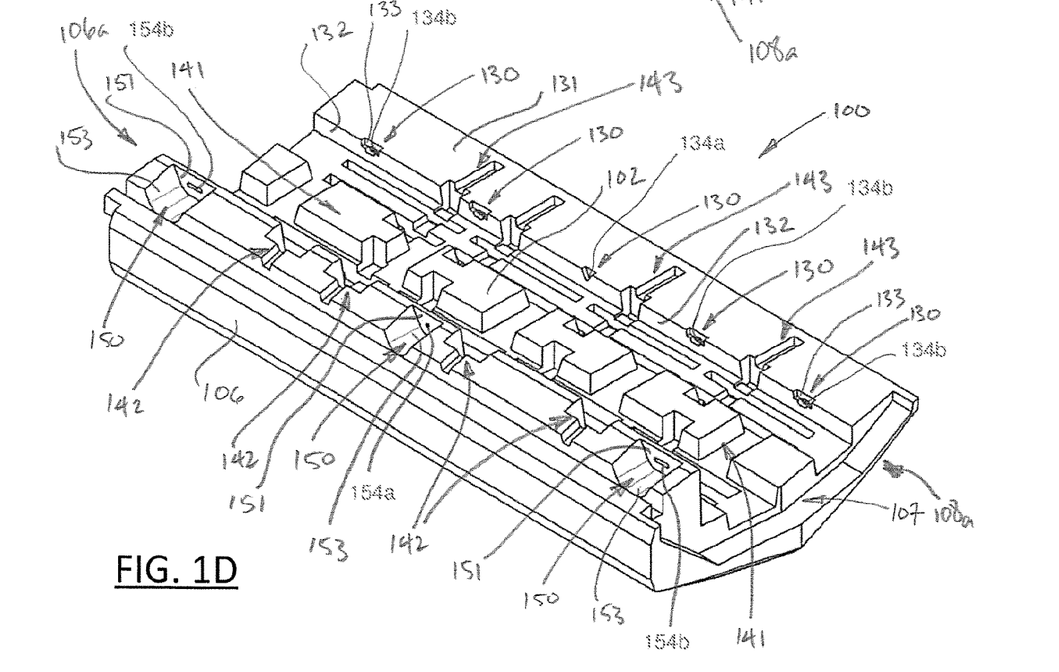
FIG. 1D is a further perspective view of a back side of the panel of FIG. 1A.
Figure 2F:
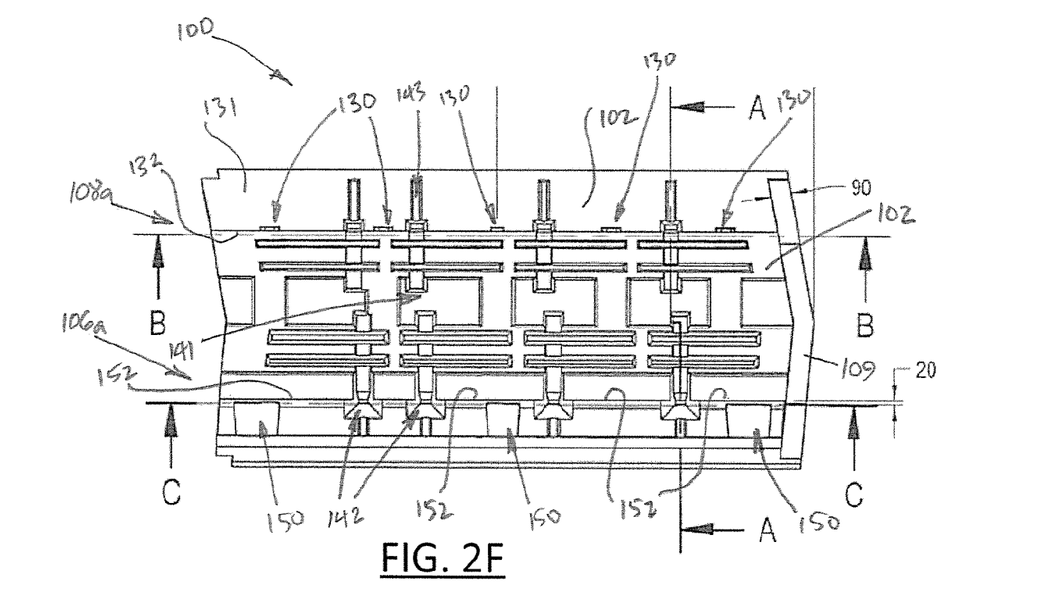
FIG. 2F is a back view of the panel of FIG. 2A.

As most readily seen in FIGS. 1C, 1D and 2F, the back wall 102 of the panel 100 also has a number of surface variations formed in it. For example, a series of upper surface variations 143 are formed at laterally spaced locations in the upper section 108a, a series of central surface variations 141 are formed at laterally spaced locations in an intermediate section of the panel (in between the upper section 108a and the lower section 106a), and a series of lower surface variations 142 are formed at laterally spaced locations in the lower section 106a. These surface variations 141, 142, 143 are in the form of variously interrupted and/or recessed and/or projected areas that are designed to lend strength and rigidity to the panel across its length. The upper and lower surface variations 143, 142 are purposefully not vertically aligned with each other or with the central surface variations in order to provide overall asymmetry to the surface variations. This asymmetry further assists with strengthening the panel 100 as it avoids repeated formations that can become loci of structural weakness. An outer surface of the central surface variations 141 may be flush with the level of the vertical wall 131 and separated therefrom by an upper longitudinal recess 145.

In some embodiments, the panel 100 may be affixed to a solid frame or structure, such as support structure 605, or in other embodiments, the panel 100 may be affixed to a structure that has spaced support areas, for example as shown in FIG. 3. The support structure shown in FIG. 3 includes an upper support 310 and a lower support 314. The upper support 310 has a projecting plate 311 coupled thereto and extending horizontally outward, with a number of mounting pins 612 (not shown) projecting upwardly from the projecting plate 311. The lower support 314 has a projecting plate 315 coupled thereto and extending horizontally outward to allow the lower section 106a to be coupled thereto, for example by bolts 756 extending through lower mounting apertures 154.

FIG. 6 also shows in side cross-section that the panel 100 is formed to have a longitudinally extending recessed area 145 below the inward ledge 132 to assist in locating the panel 100 in position relative to the mounting pins 612 before the panel is lowered down into the mounting pins 612. In some embodiments, a second support bar 610 may be used to provide further support for the panel 100, where the further bar 610 is positioned horizontally at a lower position than the (first upper) bar 610, for which case a second longitudinally extending recessed area 146 can be arranged to receive and mate with some lower mounting or engaging structure on the support structure 605. The recessed area 146 is arranged vertically between the central surface variations 141 and the lower section 106a.

Figure 7:
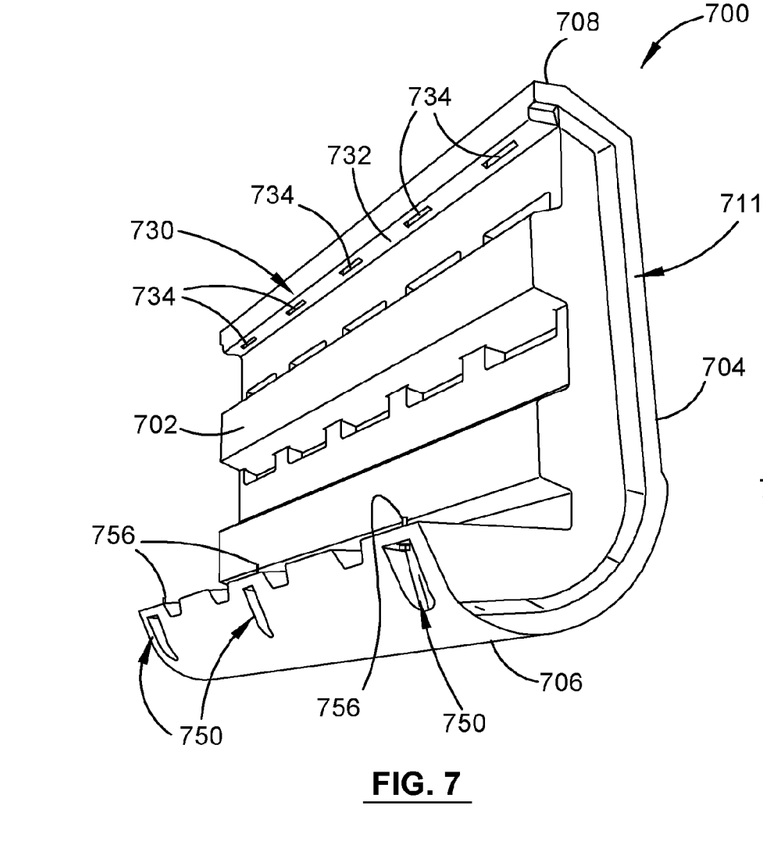
FIG. 7 is a perspective view of a back side of a panel according to some embodiments.
Figure 8:
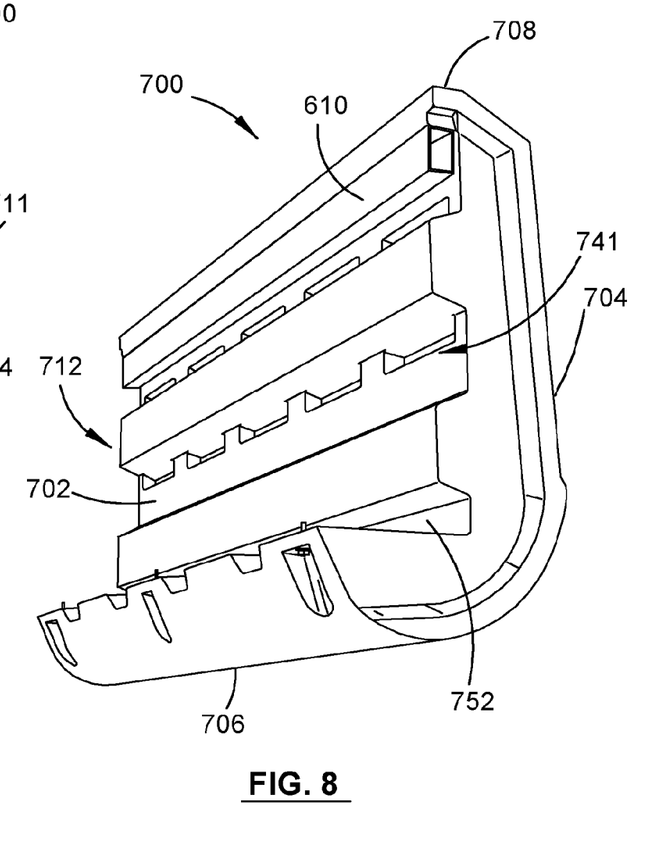
FIG. 8 is a perspective view of a back side of the panel of FIG. 7, showing how the panel can be mounted to a mounting structure.

FIGS. 7 and 8 show alternative panel embodiments 700. Panel 700 is quite similar to panel 100 in form, manufacture, function and configuration, except that it has a lesser degree of surface variation in back wall 702, it has a different aesthetic surface pattern on front wall 704 and its depth, width or length dimensions may differ somewhat from those of panel 100. The upper mounting apertures 730 comprise upper mounting slotted apertures 734 which may be similar to slotted apertures 134b to receive mounting pins 612 and may be formed in an inward ledge 732 in a similar way. Lower mounting formations 750 may be similarly formed and arranged to lower mounting formations 150 of panel 100 and may employ bolts 756 as an example coupling mechanism. The lower mounting formations 750 are disposed in a lower horizontal ledge 752 that is formed in the lower section 706 and that faces the inward ledge 732 of the upper section 708. A longitudinally extending recessed area 741 may be formed in the back wall 102 that is substantially similar to recessed area 141. FIG. 7 illustrates the panel 700 without the mounting bar 610 in place and FIG. 8 shows how the panel 700 would rest on the mounting bar 610.

Figure 9:
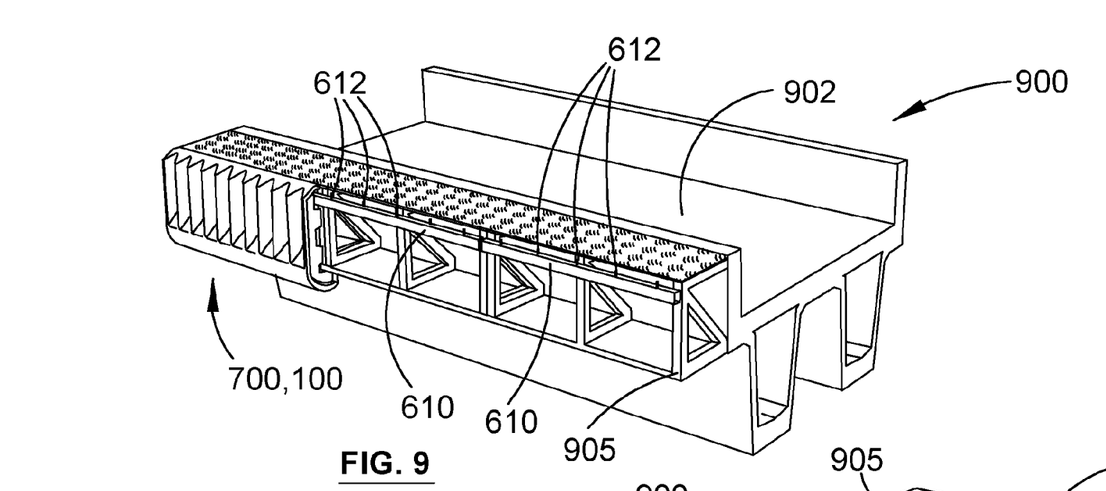
FIG. 9 is a top perspective view of a building structure with a panel mounted onto a support structure that is carried by the building structure.
Figure 10:
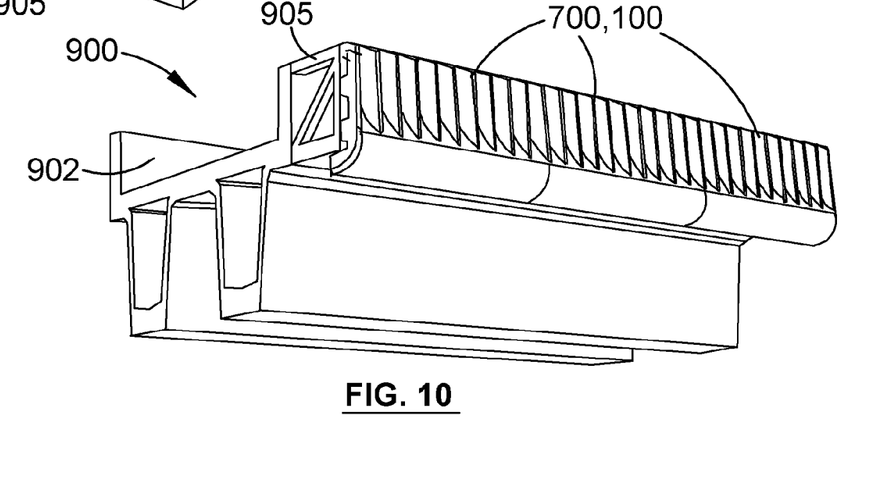
FIG. 10 is a bottom perspective view of the building structure of FIG. 10, showing multiple panels mounted onto the support structure that is carried by the building structure.

Referring now to FIGS. 9 and 10, embodiments of a cladded structure 900 are described in further detail. Structure 900 comprises multiple panels 100 or 700 positioned and arranged to be lengthwise adjacent other panels 100, 700 to form a series of horizontally adjacent cladding sections along the length of structure 900. While FIGS. 9 and 10 show how structure 900 can support multiple panels 100, 700 arranged end-to-end (extending substantially along a same longitudinal axis) on the same horizontal level, the structure 900 may in some embodiments be formed using one or more panels 100, 700 on each horizontal level and also using one or more panels 100, 700 tiled vertically one above the other.

In some embodiments, structure 900 may employ a mounting frame 905 on which to mount one or more of the panel 100, 700, where the mounting frame 906 has mounted thereon one or more rails or bars to act as support bars 610. The mounting frame 905 may be arranged to receive and engage with coupling mechanisms at a lower- or under-side thereof in order to affix the lower end 106a to the mounting frame 905. Lower end 106a of panel 100 corresponds to a similar lower end section 706 of panel 700, with panel 700 being of similar form, manufacture, function, and configuration to panel 100. The mounting frame 905 may itself be connected or coupled to a built structure, such as a precast concrete bridge section 902 or a building façade, for example. The underhanging design of the lower section 106a of panels 100, 700, for example as seen in FIG. 6, is suited to cladding certain structures, such as bridges. However, other embodiments of the panel 100, 700 may have a lower section 106a that does not include an underhanging portion and is instead arranged to be tiled (e.g. mated with lap joints or other mating structure) horizontally and vertically with (potentially many) other cladding panels across a support structure, such as a building façade.

Some embodiments of panels 100 may employ non-parallel top and bottom edges, for example giving each panel a somewhat trapezoidal appearance, with one end face 103 or 105 being longer than the other, providing such panels can still be tiled with each other to form a suitable cladding or facade.

Building structure 600 comprises support structure to support the panels 100 in a vertical orientation with the long dimension of the panels 100 extending generally horizontally.

A (generally) vertically extending gap is preferably left between adjacent first and second panel ends 111, 112 to allow for horizontal (longitudinal) thermal expansion of each panel 100 due to temperature variations. This gap may be somewhat angled relative to the vertical, or may be non-linear, such as the chevron shape shown in FIG. 2A, but generally serves to horizontally separate adjacent ones of panels 100. The separation gap may in the order of about 10 to about 50 millimetres, and possibly about 10 to 20 millimetres, for example. This is also the case for panel 700, where a generally vertically extending gap may also be left between adjacent first and second panel ends 711, 712.

A method of forming a cladding panel 100, 700 is described in further detail. First, a mould is formed. The mould must be suitable for use in rotational moulding and may be formed of machined aluminium plates, for example. The mould plates are preferably formed to have substantial uniform thickness from the back face of the mould to the front face of the mould in order to allow relatively uniform heat transmission through the material of the mould. Thus, where a particular design, texture, pattern and/or set of symbols is applied to the mould, both front and back faces of the mould plate should be machined accordingly.

The mould plates are formed to define a hollow panel when moulded, having a length greater than a width, a thickness less than the width, a front wall, an opposite back wall and opposed first and second long edge regions. The panel 100 shape thus defined has a first end 111 and a longitudinally opposite second end 112, with the first end 111 defining at least one recessed portion 107 to receive and mate with a projecting portion 109. In some embodiments, the top and bottom edge portions 108, 106 may also define mating structure in order to allow the panel 100 to tile vertically with other such tiles, as well as horizontally. This is also the case for panel 700, defined with a first end 711, a longitudinally opposite second end 712, top portion 708, and bottom portion 706.

Once the mould plates are ready, granules of a suitable polyolefin are added into the mould and the mould is closed tight. The polyolefin granules must be suitable for rotational moulding and may include polypropylene and polyethylene materials, for example. A particularly preferred polyolefin is polyethylene and preferred forms of polyethylene include those that can accommodate pigments and ultra violet radiation stabilizers (i.e. to provide a higher resistance to degradation under exposure to ultra violet radiation). One example of a polyethylene material that can be used is Qenos Alkathene 711 UV. Such polyethylene materials have a generally good chemical resistance to pollutants and can be more readily cleaned of graffiti than other materials, such as stone or concrete panel materials. Panel shells formed of such polyethylene materials may also have an anti-graffiti coating applied thereto, such as a coating provided by APP of Keysborough, Victoria, Australia. Such polyethylene materials are also readily cleanable, for example by a water jet, and do not stain or burn easily. Particular forms of polyethylene that may be suitable include linear low density polyethylene and medium density polyethylene. In some embodiments, high density polyethylene may also be used. In embodiments employing polyethylene or polypropylene as the material for the panel shell, the polyethylene or polypropylene material added into the mould preferably contains suitable additives for UV resistance and/or pigmentation and/or graffiti resistance.

The panels 100 and 700 are formed using conventional rotational moulding techniques, including heating the mould while rotating it around two different axes of rotation so that the polyolefin granules melt and accrete on the inside surfaces of the mould plates. This heating and rotation is performed for a set period of time, following which the mould is cooled and then the formed panel is removed from the mould.

Described embodiments may be used as panels for cladding of buildings or to form an exterior face or design on a building, since they are light, easily transportable and can be readily customised. Further, rotational moulding of such panels can provide significant advantages over traditional concrete panel forming.

A further advantage of panel embodiments described herein is that they are formed of a recyclable plastic that can be pelletised and used as recycled feedstock into another plastic product-forming process, if desired.

Reference is made in particular to FIG. 3, which illustrates panel 100 in cross-section. As is shown in the cross-section, panel 100 has one or more bridging portions 120 that form a material bridge between the front and back walls 104, 102. Such bridging portions 120 may alternatively be called kiss-offs. These bridging portions 120 may be formed integrally with the front and back walls 104, 102 during the rotational moulding process described herein. In some embodiments, for example as illustrated in FIG. 3, one or more of the bridging portions 120 may be formed by an inwardly extending portion 122 that extends inwardly from the back wall 102 toward the front wall 104. Such an inwardly extending portion 122 may be primarily defined by parts of back wall 102 tapering inwardly to meet with a back face of the front wall 104. In such embodiments, there may be minimal or no part of the front wall 104 that extends inwardly to meet the portion of the back wall 102 that is inwardly extending to form portion 122. However, at least a part of the front wall 104 may extend inwardly toward the back wall 102 to form a second inwardly extending portion 124 that meets a corresponding inwardly extending portion 122 at a position somewhat in between the front and back walls 104, 102. In any case, the bridging portions 120 are effectively parts of the panel (laterally inwardly of the first and second ends 111, 112) where the front and back walls 104, 102 meet. Such bridging portions 120 allow for some amount of heat transfer between the front and back walls 104, 102 and serve to strengthen the panel overall.

In other embodiments, the bridging portion 120 may comprise a first inwardly projecting portion 124 that is integrally formed with, and extends inwardly from, the outer surface of the front wall 104 and a second inwardly projecting portion 122 that is integrally formed with, and extends inwardly from, the outer surface of the back wall 102. The inwardly projecting portions 124 and 122 define opposed cavities that are recessed inwardly from the front and back walls 104, 102 toward where the projecting portions meet. The first and second projecting portions 124 and 122 may meet and bond with each other at a position toward the middle of the interior of the panel 100. A plurality of the bridging portions 120 may be disposed along the longitudinal length of the panel 100 at spaced positions inward of the opposed panel ends 111, 112. The bridging portions 120 serve to increase the structural strength of the front and back panel walls 104, 102 in the horizontal (front to back or back to front) direction. Where there is a surface pattern or variation defined by the front and/or back walls 104, 102, bridging portions 120 may be easily formed where the parts of the walls come close to each other due to the variations.

Embodiments of panels 100 do not require internal spacers or non-moulded reinforcement due to the presence of bridging portions 120 and/or the significant surface variations formed across the front and back wall 104, 102.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A moulded cladding panel, comprising:
   a hollow plastic body formed by rotational moulding, the body having a length, a width and a depth, a first end, an opposite second end, an upper section, an opposite lower section, a first major face defined by a front wall extending from the first end to the second end and from the upper section to the lower section, and a second major face defined by a back wall opposite the first major face, the second major face extending from the first end to the second end and from the upper section to the lower section;
   wherein the upper section defines a plurality of first mounting formations to facilitate mounting of the panel to a structure to be clad;
   wherein the lower section defines a plurality of second mounting formations to facilitate mounting the panel to the structure;
   wherein the first mounting formations comprise a central mounting formation and at least first and second side mounting formations that are disposed on respective first and second lateral sides of the central mounting formation, wherein the first and second side mounting formations are arranged to permit movement of the body relative to the structure and the central mounting formation is arranged to keep a central part of the body substantially laterally fixed relative to the structure; and
   wherein the central mounting formation comprises a non-slotted aperture and the first and second side mounting formations each comprise a slotted aperture.

2. The panel of claim 1, wherein the second major face defines a plurality of asymmetric surface variations.

3. The panel of claim 1, wherein the body is free of internal and/or external non-moulded reinforcing structure.

4. The panel of claim 1, wherein the body comprises at least one bridging portion where a part of the back wall extends inwardly to contact the front wall or an internal projection of the front wall, the at least one bridging portion being disposed between the first and second ends and between the upper and lower sections.

5. The panel of claim 1, wherein the first mounting formations are disposed at an upper part of the second major face, wherein the first major face is an externally facing face of the panel and the second major face faces the structure when the panel is mounted to the structure.

6. The panel of claim 5, wherein the first mounting formations are disposed on an inwardly recessed area of the second major face.

7. The panel of claim 6, wherein the first mounting formations are disposed in a wall portion of the inwardly recessed area that is arranged to be generally horizontal when the panel is mounted to the structure in a vertical orientation.

8. The panel of claim 1, wherein the second mounting formations have different formations from the first mounting formations.

9. The panel of claim 1, wherein the second mounting formations comprise a plurality of second apertures in the second major face.

10. The panel of claim 9, wherein the second apertures are defined through opposed external surfaces of the second mounting formations.

11. The panel of claim 1, wherein the body is an integrally formed unitary body.

12. The panel of claim 1, wherein the length of the panel is between about 2 m and about 4 m.

13. The panel of claim 1, wherein the depth of the panel is between about 150 mm and about 500 mm.

14. The panel of claim 1, wherein the width of the panel is between about 1 m and about 3 m, and wherein the weight of the panel is between about 60 kg and about 150 kg.

15. The panel of claim 1, wherein the first mounting formations comprise first recessed sections of the second major face.

16. The panel of claim 1, wherein the second mounting formations comprise second recessed sections of the second major face.

17. A cladded structure, comprising:
   support structure that is fixed relative to the ground; and
   at least one panel according to claim 1 mounted to the support structure.

18. The cladded structure of claim 17, wherein two of the panels are positioned end-to end in a line along the support structure.

19. A method of erecting cladding, comprising:
   positioning at least one panel according to claim 1 to be supported in relation to a structure to be clad.

20. The method of claim 19, wherein the positioning comprises positioning two of the panels end-to-end in a line along a face of the structure.

21. A method of manufacturing a plastic cladding panel, the method comprising:
   rotationally moulding a hollow plastic body, the body having a length, a width and a depth, a first end, an opposite second end, an upper section, an opposite lower section, a first major face defined by a front wall extending from the first end to the second end and from the upper section to the lower section, and a second major face defined by a back wall opposite the first major face, the second major face extending from the first end to the second end and from the upper section to the lower section;
   forming the upper section to define a plurality of first mounting formations to facilitate mounting of the panel to a structure to be clad; and
   forming the lower section to define a plurality of second mounting formations to facilitate mounting the panel to the structure;
   wherein forming the upper section to define a plurality of first mounting formations includes forming the first mounting formations to comprise a central mounting formation and at least first and second side mounting formations that are disposed on respective first and second lateral sides of the central mounting formation, wherein the first and second side mounting formations are arranged to permit movement of the body relative to the structure and the central mounting formation is arranged to keep a central part of the body substantially laterally fixed relative to the structure; and
   wherein the central mounting formation comprises a non-slotted aperture and the first and second side mounting formations each comprise a slotted aperture.

* * * * *